3,579,609
FLEX-RESISTANT POLYESTER FILM CONTAINING OLEFIN OR POLYTETRAMETHYLENE OXIDE ADDITIVE POLYMER
Robert J. Sevenich, White Bear Lake, Minn., assignor to Minnesota Mining and Manufacturing Company, St. Paul, Minn.
No Drawing. Filed Sept. 23, 1968, Ser. No. 761,786
Int. Cl. C08g *39/10, 51/54*
U.S. Cl. 260—873                                      6 Claims

ABSTRACT OF THE DISCLOSURE

Physically blending minor amounts of fusible heat-stable polymers of lower-mono-alpha olefin or tetramethylene oxide into polyester resin which is to be extruded into a film and thereafter oriented, imparts unexpectedly superior flex resistance to the ultimate film. The film also displays excellent "slip" and, in many instances, improved electrical properties. Among the suitable additive polymers are polyethylene, polypropylene, polybutylene, poly-4-methyl pentene, ethylene vinyl acetate copolymer, ethylene propylene copolymers and polytetramethylene oxide.

BACKGROUND OF THE INVENTION

The invention relates to modified biaxially oriented polyethylene terephthalate film having superior flex resistance.

Since it was first developed, polyethylene terephthalate has steadily increased in commercial utility. Biaxially oriented film formed from this polymer is strong, flexible, and useful in electrical insulation and as a backing for pressure-sensitive adhesive tape, magnetic recording tape and many other products. Because of its strength and flexibility at a wide range of temperatures, such film has also been widely used for packaging. Bags, or pouches, may be formed by coating one face of a film with a heat-activatable adhesive, placing the adhesive-coated surfaces of two panels cut therefrom in superposed contact, and heat sealing three edges. Liquids—e.g., motor oil fuel, water, acids, food products, etc.—may be placed in such pouches, after which the remaining side is sealed, thereby providing a disposable light weight compact method of packaging. Unfortunately, however, when such packages are shipped for considerable distances, the repeated flexing of the film tends to cause cracks, resulting in the ultimate failure of the package.

One way in which the comparative flex resistance of films can be determined is to form bags as described above, fill them with an electrolyte, and immerse them in another electrolyte. One electrode is then placed in the bag contents, extending from the bag, while another electrode is placed in the bath, likewise extending therefrom; a battery and a signal or recording device then are connected between the two exterior portions of the electrodes. After setting up the equipment in the manner just described, the bag is repeatedly flexed, current flowing through the circuit when flex cracking takes place. When subjected to this test, bags formed from biaxially oriented polyethylene terephthalate film typically fail in 2–9 minutes.

A Gelbo flex tester (commercially available from Testing Machines, Inc. under the trade designation TMI 31–5) may also be used to determine the flex resistance of film. In this device, two opposed sides a 9″ x 12″ sheet of film are brought into edge-to-edge contact, forming a tube. Each end of the tube is then gripped between parts of circular jaws, spaced 9.1 inches apart. While one pair of jaws remains stationary, the opposing pair of jaws simultaneously moves 4.5 inches inward toward the stationary jaws, rotates through 540°, and then returns to its original position. This cycle is repeated at the rate of 2,000 per hour. The resultant flexing causes pin holes to develop in the film. After one hour the film is removed from the tester, placed in contact with a blotter and a thin layer of water-soluble dye squeezed over the exposed surface and against the blotter through each pin hole, forming dots of dye on the blotter. The number of dots is then counted, low numbers indicating superior flex resistance. Standard biaxially oriented polyester film develops about 55 holes per 100 square inches in this test.

SUMMARY

The present invention provides modified polyethylene terephthalate film which maintains the desirable physical characteristics of unmodified film. In addition, however, the film of this invention displays an outstanding ability to resist exposure to repeated flexing without failures; e.g., film has been prepared in accordance with this invention which resists flexing for as much as 100 times as long as unmodified film. It will thus be apparent that polyethylene terephthalate film prepared in accordance with this invention displays a completely new range of application, lending itself to the packaging of fruit juices, vegetable oils, perishable foodstuffs like meat slices, cheese, etc., and many other commodities susceptible to damage when the package containing them develops cracks which permit the contents either to escape or to become contaminated.

In accordance with the invention, minor amounts of fusible, heat-stable homopolymers or copolymers of mono-alpha olefin are blended with polyethylene terephthalate polymer prior to extrusion. The blending can be effected either by adding the olefin polymers to the reaction kettle in which polyethylene terephthalate is polymerized or by introducing both the polyester and additive polymers into the extruder. As little as 2% of the additive polymer is sufficient to produce a several fold improvement in flex life. The upper limit of additive is generally determined by balancing the degree of flex resistance required against decrease in tensile strength or lowering of melting point. Generally speaking, there appears to be no particular advantage to adding more than about 15% olefin polymer, although the advantages of the invention may be realized with even greater amounts, e.g., up to 40% or more.

The term "fusible" in the preceding paragraph excludes such intractable polymers as polytetrafluoroethylene. Similarly, the term "heat-stable" excludes such polymers as polyvinyl chloride, which decomposes when subjected to the moderately elevated temperature at which polyethylene terephthalate fuses.

When examined under the electron microscope, films formed from polyester-olefin polymer blends are seen to consist of elongated globules of polyethylene embedded in the polyester. The thickness of the globules ranges from 0.1 to 0.5µ and the width and length dimensions range from 0.25 to 6.5µ or larger. No voids are seen around the platelets, a fact which is somewhat surprising in view of the incompatibility of polyester and polyolefin polymers, as evidenced by the fact that if the two polymers are fused in a test tube, they separate into distinct layers. Polyester polymer which is to be made into film conventionally includes small particles of an inorganic "slip agent" to facilitate unwinding of the roll, prevent blocking, and otherwise facilitate handling. These inorganic inclusions tend to cause minor variations in caliper of the film formed therefrom, the quality which is particularly discerning in the manufacture of such products as video tape, where "dropouts" often occur. Biaxially oriented film formed in accordance with the present invention, omitting any inorganic slip agent, is more uniform in caliper than films containing conventional inorganic slip agents. As a result, magnetic recording tape and other film products made therefrom cannot only be subjected to more severe stress and flexing but also can be manufactured with less waste and used with little or no scratching, seizing or blocking. For this purpose, as little as ¼% of the olefin polymer additive is effective.

DESCRIPTION OF PRESENTLY PREFERRED EMBODIMENTS

The invention will be better understood by reference to the following illustrative but nonlimiting examples, in which all parts are by weight unless otherwise noted.

EXAMPLE 1

In a stainless steel reactor equipped with a distillation column and an agitator, 62 parts of dimethyl terephthalate was transesterified with 44 parts of ethylene glycol, in the presence of 0.018% zinc acetate and 0.025% antimony trioxide. After removing the methanol which was evolved in the reaction, the reaction mixture was raised to 250° C. for 32 minutes, at the end of which time 95% of the theoretical excess of ethylene glycol had been distilled and collected. The vessel was then opened and a branched polyethylene having a density of 0.918, an average melt index of 3.5 and an average molecular weight of 20,000 (commercially available from Union Carbide under the trade designation "DFD3300") added, after which the vessel was resealed and the contents stirred for 5–10 minutes while purging with an inert gas. A vacuum was slowly applied while the prepolymer was rapidly stirred and gradually heated to 280° C. Heating and stirring was continued for one hour after a pressure of 0.5 mm. Hg was obtained. The liquid polymer blend was removed from the vessel, allowed to cool and solidify, and then broken into small chunks for subsequent extrusion.

A family of polymer blends of polyethylene terephthalate and various amounts of branched polyethylene was prepared in the manner just described. Each such blend was extruded, biaxially oriented (using a 3:1 stretch ratio in both length and cross directions) to a thickness of ½ mil, and then laminated to a 2 mil film of low density polyethylene, using the laminating technique described in U.S. Pat. Nos. 3,188,265 and 3,188,266. Pouches were then formed from each of the resulting laminates by cutting two 5½" x 8" panels, placing the polyethylene surfaces in coterminous contact, and heat-sealing at 180° C. and 40 p.s.i. in a ½-inch wide path around one 5½-inch side and the two 8-inch sides. Into each pouch was then poured 300 cc. of 0.02 N HCl, after which the pouch was gripped along the open 5½" side and placed in a tank containing 2½ inches of 0.01 N HCl, the sealed 5½" side of the pouch resting on the bottom of the tank. One electrode was placed in the tank and another inserted into the pouch, extending from the open side thereof. The two external portions of the electrodes were connected through a battery and a continuously recording ammeter. The pouch was then repeatedly raised 1½ inches off the bottom and lowered to its initial position at a rate of 100 cycles per minute, the pouch alternately resting against the bottom of the tank and being lifted completely free thereof. Failure was considered to have occurred when the conductivity, as recorded by the ammeter, was equal to 20 microamps.

Tabulated below are the flex test results obtained for polyethylene terephthalate film containing various amounts of polyethylene, prepared in accordance with this example, each figure representing an average of 10 samples:

| Weight percent of polyethylene: | Failure time, minutes |
| --- | --- |
| 0 (Control) | 9 |
| 12 | 38 |
| 16 | 208 |
| 25 | 44 |
| 32 | 54 |

The data above show that although adding 25% or more polyethylene improves the flex crack resistance of unmodified polyester film by a factor of five or six, results are comparable to those obtained by adding 12% polyethylene.

The increased amount of polyethylene additive contributes dramatically to the increase in flex life of the blended polymer. As the concentration of polyethylene increases, however, the tensile strength slowly decreases. It is surprsing to note that the tensile properties decrease much more slowly than the increase in flex life would suggest. Biaxially oriented films formed from polyesterpolyethylene blends containing 5–20% polyethylene offer an outstanding combination of high tensile strength and high flexibility, the apparent optimum being a blend containing 16% polyethylene. Above the 16% polymer additive level the film becomes difficult to orient to the same stretch ratio, apparently becoming too highly oriented and actually weakening and decreasing in flexibility.

The kettle blending technique affords the maximum amount of mixing for the dissimilar polymers and yet can be accomplished with a minimum of equipment. "Hold-up" in the recesses of the kettles and the lengthy clean-up times required to remove two different polymers from the same piece of equipment, however, are distinct drawbacks in comparison to the following procedures.

Polyolefin-polyester blends for use in making films can alternatively be prepared by grinding polyethylene terephthalate polymers into small chunks, adding olefin polymer pallets thereto, and stirring, shaking, or otherwise agitating the blend to produce uniform dispersion. The mixture is then dried to remove any water picked up from the atmosphere, extruded as film and the film then biaxially oriented. Blends containing relatively high percentages of olefin polymer (e.g., 30%) can be prepared in this way more readily than by adding olefin polymer directly to the polyethylene terephthalate kettle, which might lack the necessary capacity.

The preferred way to prepare polymer blends in accordance with the present invention is to "tap" the barrel or feed zone of an extruder used for preparation of polyethylene terephthalate film, attaching a second extruder at this location to permit feeding the second polymer into the barrel. This method combines the advantages of rapid and intimate mixing in the extruder screw, simplicity and greatly reduced possibility of any detrimental interaction between the two polymers.

The main criterion for selecting a polymer to be blended into the polyester is the stability of the polymer at the extrusion temperature of polyethylene terephthalate. The atmosphere inside the extruder is essentially inert to short dwell times will not cause degradation in most polymers. Polyvinyl chloride is an example of an additive polymer which readily degrades at elevated temperatures, splitting off gaseous by-products. This material does not lend itself to coextrusion with polyester.

An examination of the techniques involved in blending the polymers has shown that different degrees of flex crack resistance are obtained by the different methods of blending. The kettle blending method, because of the long contact times between the polymers, gives an intimate mixture with the highest amount of flex crack resistance. This technique could not be used for polymers that could interact such as nylon with polyester wherein chain interaction and polymerization would occur.

The type of blending to be used can be decided by the degree of mixing desired and availability of equipment. If a large extruder is available with good mixing properties this might be preferred to a kettle blend. If the extruder cannot mix the materials adequately the polymer resins could be premixed and then fed into the extruder. This could be accomplished by dry mixing the resins or even by melting and mixing the resins in a separate mixing tank.

Even at low temperatures comparable to those used for storing and shipping food or dairy items, the flex crack resistance of the blended films is far superior to that of the basic polyester control at room temperature, as is shown by the following table:

| Weight percent of polyethylene blended with polyethylene terephthalate | Temperature, °C. | Failure time, minutes |
| --- | --- | --- |
| 0 (laminate of 100% polyester and polyethylene) | 25 | 9 |
| Do | −26 | 2 |
| 16 laminate of blended film and polyethylene | 25 | 208 |
| Do | +4 | 104 |
| Do | −10 | 46 |
| Do | −26 | 11.2 |

Example 2

Following the procedure described in the preceding example, 16% branched polyethylene, having a density of 0.918 and a melt index of 0.7 (commercially available from Union Carbide under the trade designation "DFD" 5500) was blended into polyethylene terephthalate. Polyethylene-modified polyester film was then prepared as described in the preceding example. When subjected to the test there described, the flex life was found to be 85 minutes at room temperature.

Example 3

Example 2 was repeated, using, however, a polyethylene having a density of 0.935 and a melt index of 1.6 (commercially available from Gulf Oil Corporation under the trade designation "Gulf 2504"). Flex life of the product was 116 minutes.

Example 4

Several blends of polyethylene terephthalate and hydroxy-terminated polytetramethylene oxide (commercially available from Quaker Oats Co. under the trade designation "Polymeg") were prepared and evaluated in the manner described in the preceding example. Results are tabulated below:

| Additive polymer | | Flex life, minutes |
| --- | --- | --- |
| Molecular weight | percent | |
| 3,000 | 8 | 37 |
| 3,000 | 12 | 56 |
| 3,000 | 16 | 200 |
| 1,500 | 12 | 6 |

EXAMPLE 5

Several blends of polyethylene terephthalate and atactic polypropylene (commercially available under the trade designation "Chevron 4091") were prepared and evaluated as described in preceding examples. Results are tabulated below:

| Percent Polypropylene | Flex life, minutes |
| --- | --- |
| 8 | 24 |
| 12 | 29 |
| 16 | 34 |

EXAMPLE 6

Using two extruders—one feeding additive polyethylene polymer ("DFD 3300") into the bulk of the polyester—a family of polyester:polyethylene blends was prepared. The following table lists some of the variables examined:

| Weight percent polyethylene | Failure time [1] (min.) | Elongation at break (percent) | Tensile at break (p.s.i.) |
| --- | --- | --- | --- |
| 0 | 2–4 | 132 | 34,000 |
| 2 | 14 | 122 | 33,500 |
| 3 | 33 | 132 | 31,800 |
| 4 | 40 | 122 | 32,400 |
| 5 | 33 | 109 | 30,200 |
| 7 | 45 | 112 | 29,800 |
| 8 | 49 | 104 | 29,600 |
| 9 | 49 | 100 | 28,300 |
| 11 | 63 | 92 | 26,700 |
| 12 | 61 | 61 | 21,400 |
| 14 | 55 | 85 | 24,600 |
| 100 | 200+ | 530 | 1,650 |

[1] Flex test previously described.

These data illustrate the effect of higher loadings of polyethylene on the physical properties of the polyester film. A 14% addition of polyethylene has brought a 30% reduction in physical properties. Because of the vast differences in physical requirements for the multitude of packaged products, there is no general guide-line as to the desirable relation of tensile, elongation and flexibility. Packages made from films having tensile strengths below the 10–15,000 p.s.i. range offer only slight advantages over polyolefin packages and would be unusable for many applications demanding high strength packaging materials. Biaxially oriented films formed from polyester-polyolefin blends containing 3–20% polyolefin have been found most applicable for the majority of packaging applications requiring both toughness and flexibility.

EXAMPLE 7

Blends of polyester and polybutylene (commercially available from Petro-Tex Chemical Corp. under the trade designation "Butuf" were prepared, converted to oriented film as in Example 6, and subjected to the Gelbo flex test previously described. Results are tabulated below:

Weight percent polybutylene:     Holes per 100 in.$^2$ after 60 minutes
- 0 (Control) _____ 55
- 5 _____ 16
- 12 _____ 1

EXAMPLE 8

A sampling of polyester:olefin polymer blends were prepared, formed into film, biaxially oriented and subjected to the Gelbo flex test previously described. Results are tabulated below:

| Polymer additive | | Holes per 100 inches$^2$ after 60 minutes |
| --- | --- | --- |
| Percent | Type | |
| 0 (control) | | 55 |
| 16 | Polyethylene | 1 |
| 40 | do | 3 |
| 5 | Polyethylene:polypropylene block copolymer. | 6 |
| 9 | Polypropylene | 6 |
| 8 | Polyallomer (extrusion grade ethylene copolymer available from Tenite Corporation). | 5 |
| 30 | Ethylene:vinyl acetate copolymer | 3 |

Although a wide variety of polymer additives have been examined (including nylons, polycarbonate, polystyrene, fluorocarbons and others) only the heat-stable polymers of lower olefins and polytetramethylene oxide have imparted the greatly improved flexibility indicated above. Many additives impart other advantages but actually decrease flexibility. It has been found possible, however, to add two or more polymers (e.g., polystyrene and polyethylene) to polyethylene terephthalate, thereby improving electrical properties with one additive and improving the flexibility with a second additive.

EXAMPLE 9

The advantage in flex crack resistance afforded by polyethylene can also be shown by a blend of polyethylene in a nylon-polyester blend.

| Percent additive | | Holes per 100 inches² after 60 min. (Gelbo tester) |
|---|---|---|
| Polyethylene | Nylon 6 | |
| 0 | 0 | 55 |
| 0 | 8 | 60 |
| 7 | 7 | 1 |

The type of polymer found most effective in producing flexibility in PETP is the general class of polyolefins. The group consist of polyethylene, polypropylene, polybutylene, poly 4-methyl pentene and polytetramethylene oxide. Variations such as ethylene-propylene block copolymers, polyallomers and ethylene-vinyl acetate copolymers have also proved to be as effective as the homopolymers.

From the test data gathered it has been shown that a 3–20% blend of polyolefins in polyester is the range necessary for optimum flex crack resistance. Levels down to 2% also give a decided advantage but to a lesser degree. Levels above 20% are still many times as good as the control values but the high physical properties of the polyester are dramatically lowered. In fact, the test data for the 40% polyethylene blend shows flexibility comparable to the best blends in the polyolefin group.

It has also been found that the addition of olefin polymers to polyesters modifies the electrical properties of films formed therefrom. The following table illustrates the effect of adding 10% of various olefin polymers.

| Additive olefin polymer | | At 105° V. dielectric constant, 100–100,000 Hz. | Dissipation factor×10³ 10,000 Hz. at | | |
|---|---|---|---|---|---|
| Percent | Type | | 25° C. | 75° C. | 125° C |
| 0 | | 3.75–3.55 | 10 | 3.2 | 15 |
| 10 | Polyethylene ("DFD" 3300). | 3.10–3.05 | 10 | 2.8 | 10 |
| 10 | Polypropylene ("Chevron" 4091). | 3.25–3.15 | 9.2 | 2.8 | 10 |
| 10 | Polypropylene ("Chevron" 6091). | 3.20–3.12 | 8 | 2.5 | 9.0 |
| 10 | Polybutylene. | 3.25–3.15 | 8.7 | 2.5 | 9.5 |

It is recognized that others have heretofore blended alkyl olefin polymers into polyesters which were thereafter molded; see, e.g., U.S. Patents 3,322,854, 3,359,344, and 3,361,848. It is believed, however, that prior to the present invention, there have never been biaxially oriented films made from such blends and, a fortiori, there has never been any prior recognition of the strikingly improved flex resistance obtained from such films.

I claim:

1. A biaxially oriented film having the combined properties of strength, heat resistance and outstanding flex resistance, said film being formed from a visually uniform blend of a major portion of polyethylene terephthalate polymer and an effective minor amount, up to about 40% by weight, of a solid, fusible heat-stable additive polymer selected from the group consisting of
   (a) alpha olefin polymers of lower alpha olefin monomers selected from the group consisting of ethylene, propylene, butylene, and 4-methyl pentene,
   (b) ethylene: vinyl acetate copolymer and
   (c) polytetramethylene oxide,
   said additive polymer being distributed throughout said film in the form of discrete microscopic particles.

2. The film of claim 1 wherein the additive polymer is present in an amount equal to about 2–30%.

3. The film of claim 2 wherein the additive polymer is polyethylene.

4. The film of claim 2 wherein the additive polymer is polytetramethylene oxide.

5. The film of claim 1 wherein the microscopic particles are in the form of micro-platelets.

6. The film of claim 2 wherein the additive polymer is poly 4-methyl(pentene).

References Cited

UNITED STATES PATENTS

| Re. 26,928 | 2/1966 | Miller et al. | 264—289 |
| 3,313,870 | 4/1967 | Yazawa | 264—290 |
| 3,359,344 | 12/1967 | Fukushima | 260—873 |
| 3,405,198 | 10/1968 | Rein et al. | 260—873 |
| 3,432,591 | 3/1969 | Heffelfinger | 264—289 |

FOREIGN PATENTS

| 1,539,880 | 8/1968 | France | 260—873 |
| 683,041 | 3/1964 | Canada | 264—289 |
| 1,282,373 | 12/1961 | France | 260—873 |
| 6,511,744 | 2/1967 | Netherlands | 260—873 |
| 17,769 | 12/1965 | Japan | 264—289 |

WILLIAM SHORT, Primary Examiner

E. WOODBERRY, Assistant Examiner

U.S. Cl. X.R.

260—45.7; 264—289